United States Patent [19]

Davene

[11] 4,403,326
[45] Sep. 6, 1983

[54] ELECTRIC ARC FURNACE WITH CONTROLLED OPERATION

[75] Inventor: Jean Davene, Villars, France

[73] Assignee: Clesid S.A., Saint-Chamond, France

[21] Appl. No.: 276,860

[22] Filed: Jun. 24, 1981

[30] Foreign Application Priority Data

Jul. 1, 1980 [FR] France ................................ 80 14639

[51] Int. Cl.³ ............................................. F27D 19/00
[52] U.S. Cl. .......................................... 373/71; 373/73;
373/102; 374/147
[58] Field of Search ........................ 373/70, 71, 73, 74,
373/75, 76, 102, 104, 105; 374/112, 147, 179

[56] References Cited

U.S. PATENT DOCUMENTS 1,338,881  5/1920  Stock .................................... 373/102
2,699,059  1/1955  Whitehouse .................... 374/179 X Primary Examiner—Roy N. Envall, Jr.
Attorney, Agent, or Firm—Pollock, Vande Sande & Priddy

[57] ABSTRACT

Electric arc furnace, of the type having metallic walls (2) and an at least partly metallic roof (1), and provided with radiation detection apparatuses (8) for their controlled operation. Differential water circulation transducers (8) are positioned in the intrados of the metallic part (7) of the roof (1); they project with respect to the inner surface of the roof and their end faces (16) facing the interior of the furnace are concave.

2 Claims, 5 Drawing Figures

ELECTRIC ARC FURNACE WITH CONTROLLED OPERATION

FIELD OF THE INVENTION

The present invention relates to electric arc furnaces, of the type with metal side walls and with a roof which is at least partly metallic and provided with radiation detection apparatuses for their controlled operation, which may be automatic or semi-automatic.

BACKGROUND OF THE INVENTION

An arc furnace of this type is generally constituted by a hearth made of very thick refractory material, thinner metal side walls with water circulation, and by a metal roof cooled by water circulation the central part of which, surrounding the electrodes is, however, made of very thick refractory material.

With furnaces of a model which is already old, constructed entirely of refractory material, it is now usual to control the furnace using statistical thermal mappings made with records obtained by means of radiation sensors, or transducers, positioned on the refractory wall of the furnace, above the maximum level of liquid steel therein. However, this type of transducer, termed a "wall probe", does not provide a satisfactory industrial solution because it is difficult to maintain and operate. With such furnaces, it is impossible to position these sensors in the roof because, as it is constructed of refractory bricks undergoing continual wear, this does not constitute a sufficiently rigid and unvarying support to receive such transducers.

In the case of modern furnaces comprising metal side walls cooled by water circulation and a partly metallic roof also cooled by water circulation, the attempt was obviously made, as formerly, to position heat flow transducers in the inner surface of the metal side walls. This method of construction, however, raises some problems. In practice, as was also the case previously with probes in refractory walls, these transducers rapidly becomes covered to a thickness of slag forming a lining, which lessens their sensitivity and, on account particularly of the "stair" formed at the junction of the side wall and the hearth as a result of their different thicknesses, a quite considerable bank of unmelted scrap iron forms at the edges of the furnace, eventually practically covering the walls to such a height that the wall probes are covered and are then unable to supply exact and immediate data on the thermal state of the furnace.

SUMMARY OF THE INVENTION

The arc furnace with metal side walls and at least partly metallic roof of the invention does not have these drawbacks, as it is equipped with efficient, industrially viable radiation sensors, which gather practically no slag. It is equipped with heat flow transducers fixed to the intrados of the roof at its metal part, each of the said transducers has an end part which projects with respect to the inner surface of the metal part of the roof, and the end surface which is directed towards the interior of the furnace is in shape concave in shape.

In addition, advantageously, these transducers are differential liquid circulation transducers which allow slag gathering to be even better avoided, as will be described in detail hereinafter.

BRIEF DESCRIPTION OF THE DRAWINGS

Several embodiments of the invention will now be described with reference to the attached drawings, in which.

DESCRIPTION OF A PREFERRED EMBODIMENT

Figure 1:
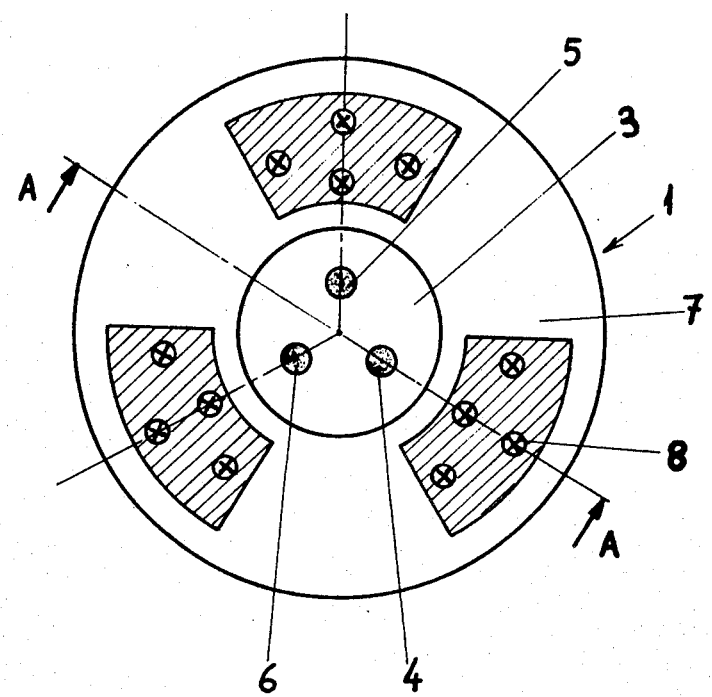
FIG. 1 is a diagrammatic plan view of the electric arc furnace of the invention.
Figure 2:
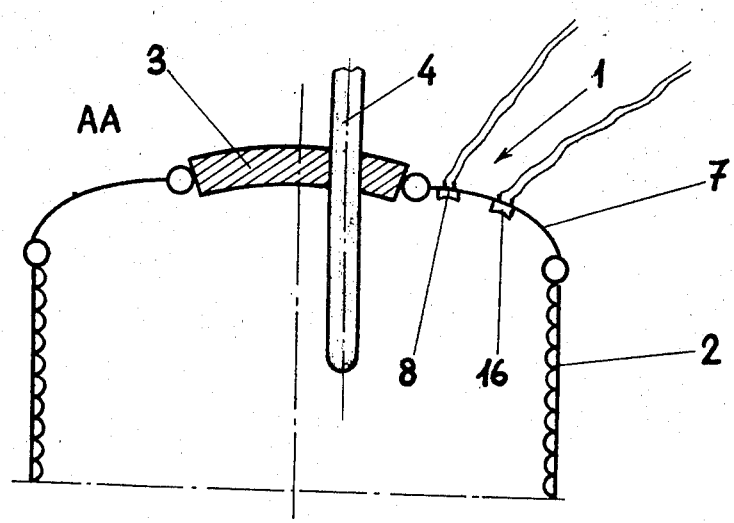
FIG. 2 is a diagrammatic section along line A—A of FIG. 1.

With reference to FIGS. 1 and 2, reference numeral 1 designates the roof of the furnace which, in the example concerned, is of the type disclosed in applicant's French Patent Publication No. 2 476 823, and reference numeral 2 designates the metal side wall cooled by water circulation having, in the example concerned, a structure of the type disclosed in applicant's French Patent Publication No. 2 445 942.

The roof 1 is formed on the one hand by a central part 3 made of refractory material with a passage left, however, for the electrodes (4, 5, 6) and on the other hand by an annular metal peripheral part 7 cooled by water circulation. In conformance with the invention, heat flow transducers 8 are disposed at the intrados of the metal part 7 of the roof 1. As FIG. 2 also shows, they project towards the interior of the furnace with respect to the surface of the metal part of the roof, and their end face 16 facing the hearth has a concave surface. The latter two arrangements allow the formation of a solid layer on the said end face 16 due to the deposition of slag, without impeding the formation of such a lining layer on the rest of the surface of the intrados of the roof. In practice, because of these arrangements and because of the thermal shocks which are necessarily produced when the furnace is operating, the fine layer of slag which tends to form on the said end face 16 immediately cracks up and then falls into the interior of the furnace without carrying away the adjacent layer formed on the surface of the intrados of the roof, thanks to the projecting character of the transducer.

As FIG. 1 shows, the transducers 8 are advantageously positioned in the hatched regions located in the vicinity of each of three axes at 120 degrees of the trefoil formed by the three electrodes (4, 5, 6). Several transducers are preferably put in each region, which allows a more pertinent analysis of signals received and hence better conclusions to be drawn for controlling the operation of the furnace, either during melting stages or during the production stages following them before casting. In addition, the coupling of the transducers 8 under the roof, made possible industrially by the use of a partly metal roof, prevents obstruction of the transducers by scrap iron and allows a better analysis in general of the radiation in the inner part of the furnace.

Figure 3:
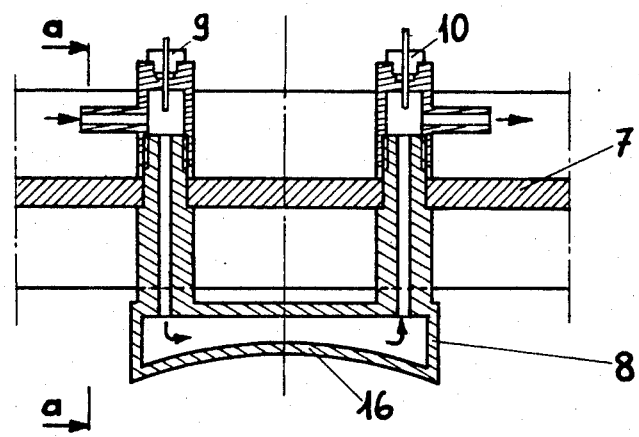
FIG. 3 is an enlarged detail of FIG. 2, representing a first type of heat flow transducer which can be used.
Figure 4:
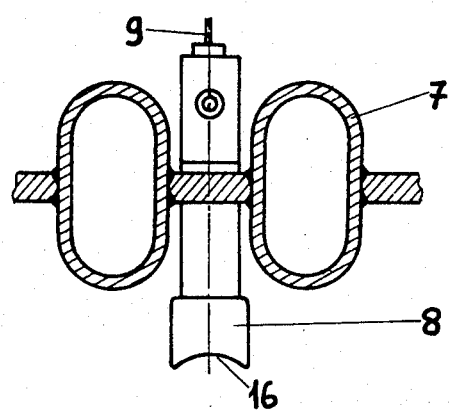
FIG. 4 is a sectional view along line A—A of FIG. 3.

A type of heat transducer which can be used for the apparatus of the invention is represented in FIGS. 3 and 4, by way of example. Such a transducer is constituted by a metal casing inside which a current of water circulates at a relatively low rate of flow, of the order of some liters per minute, to be specific, as indicated by the arrows in FIG. 3. Two thermocouples (9, 10) measure the temperature of the water at the inlet and outlet of the transducer 8, respectively; the difference between these two temperatures is then representative of the flow of heat received by the transducer 8. In the example concerned, the end face 16 of the transducer has been made concave in both the longitudinal direction and the transverse direction. The surface 16 can clearly also be made concave in only one or the other direction. This type of heat transducer has the advantage of even better facilitating disengagement of slag from the end face 16, because of additional thermal shock due to differences in temperature produced on the face 16 by the circulation of water in the transducer.

Figure 5:
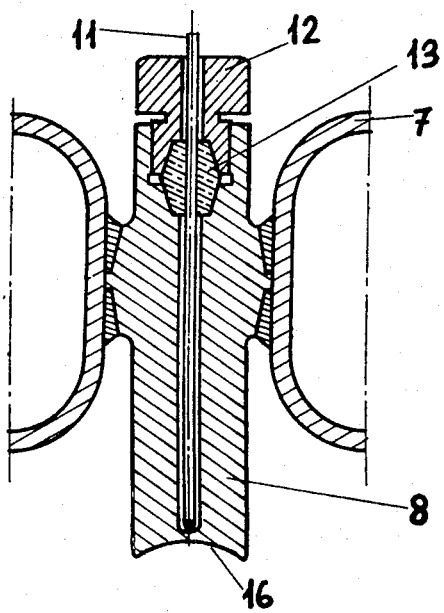
FIG. 5 is a sectional view of a second type of transducer which can be used.

FIG. 5 shows another type of heat transducer 8 which can be used for the invention, possibly accompanied by transducers of the previous type. This is constituted by a cylindrical metal piece made solid with the metal part 7 of the roof and the variations in temperature of which are measured by means of a thermocouple 11 plugged into the said piece by conventional support means constituted by a screwed plug 12 and retaining knob 13. As the piece is cylindrical, its end face 16 is shaped, in conformity with the invention, like a concave circular mirror.

I claim:

1. Electric arc furnace with metal side walls and an at least partly metallic roof, equipped with heat flow transducers (8) fixed to the intrados of said roof (1) at its metallic part (7), each of said transducers having an end part projecting with respect to the inner surface of said metallic part of said roof, the end surface (16) of each of said transducers directed towards the interior of said furnace being concave.

2. Electric arc furnace according to claim 1, wherein at least some of said transducers comprise differential liquid circulation transducers.

* * * * *